Nov. 20, 1962 L. R. WRATHALL 3,065,297

REGENERATIVE PULSE REPEATER

Filed Feb. 19, 1959

INVENTOR
L. R. WRATHALL
BY Harry C. Hart
ATTORNEY 3,065,297
Patented Nov. 20, 1962

3,065,297

REGENERATIVE PULSE REPEATER

Leishman R. Wrathall, Summit, N.J., assignor to Bell Telephone Laboratories, Incorporated, New York, N.Y., a corporation of New York Filed Feb. 19, 1959, Ser. No. 794,434
15 Claims. (Cl. 178—70)

Figure 1:
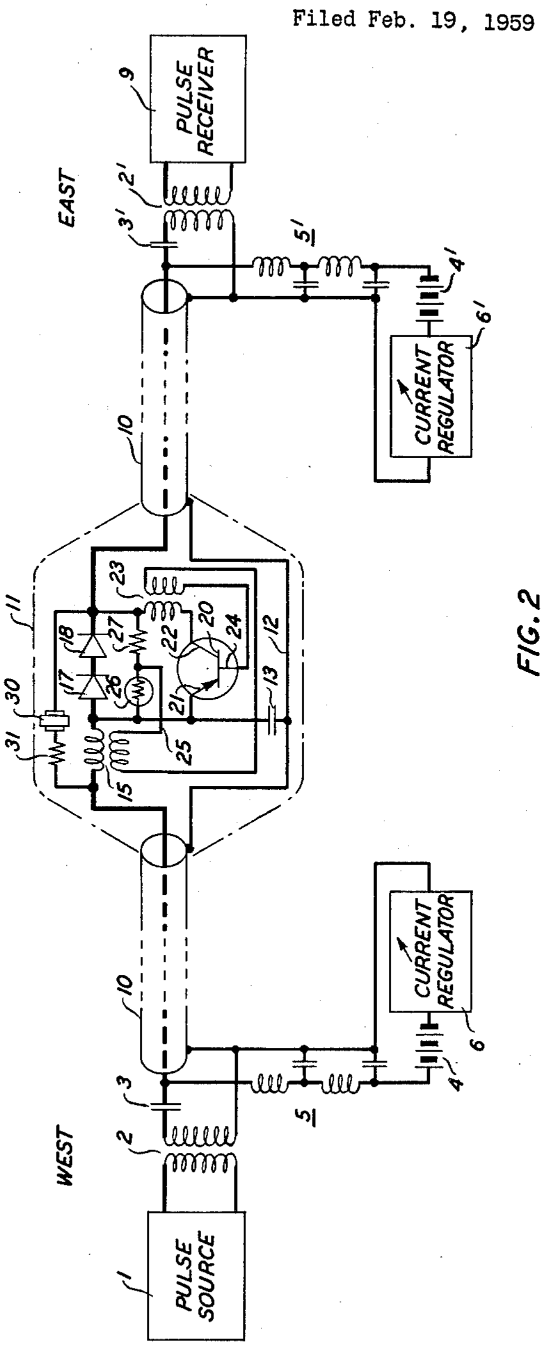

The present invention deals with long distance message transmission by wire and particularly across a great, relatively inaccessible, space such as the ocean. The invention will be illustrated and described as applied to a deep sea cable system such, for example, as might be employed to connect America with Europe for telephony. It will be evident as the description proceeds, however, that many of the aspects and features of the invention, while peculiarly appropriate for transmission over long distances and across inaccessible spaces, are not so limited, being useful as well under less stringent conditions.

It has long been known that, in order to transmit messages over a long path without making provision for signal power so large as to prevent the development of intolerably small signal to noise ratios, it is advantageous to provide repeaters at intervals along the length of the path. Any such repeater must, of course, be supplied with operating power; and local power supplies normally require maintenance, and, from time to time, replacement. The problem thus presented has been neatly solved, at least for unprocessed telephone messages, by O. E. Buckley and O. B. Jacobs; and their solution is presented in their Patent 2,020,297, granted November 12, 1935. The repeater of that patent comprises a vacuum tube amplifier into which, and out of which, message waves are coupled in conventional fashion by way of transformers, while all bias voltages required by the amplifier are developed across resistors provided for the purpose and supplied with bias current that flows on the conductors of the cable, along with the mesage signal, from a bias current source located at one end of the cable or divided between the two ends. Simple as it is, the entire assembly may be built into a nodule of only slightly greater diameter than the cable itself. This, of course, reduces the seriousness of the engineering problems that face the cable laying crew.

While the advent of the transistor, without more, enables the construction of a message repeater according to the Buckley-Jacobs patent with even smaller dimensions, it has coincided in point of time with the development of pulse transmission techniques. The great advantage of pulse transmission lies in the possibility it offers for regeneration, in contrast to mere amplification, and in the fact that, provided only that the spacing along the transmission path between adjacent repeaters is sufficiently close, the regeneration of the amplitude of each pulse can be substantially perfect, thus removing all noise gathered in the course of transmission. To the end of achieving perfection of regeneration as nearly as possible, the pulse regenerator apparatus itself has been developed along complicated lines including gates, trigger circuits, quantized feedback and all the rest, as exemplified, for example, in W. R. Bennett Patent 2,797,340, granted June 25, 1957. Such complications go a long way to offset, at least in the case of a repeater for an undersea cable, the advantages offered by pulse transmission.

The present invention approaches the problem of pulse regeneration, especially in the case of a repeater to be located in a comparatively inaccessible position such as the bottom of the sea, from a different avenue. It starts with the position that the development of all necessary biases from an auxiliary current, of substantially constant strength and originating at the transmitter station, is essential as a first step; and it undertakes to make every possible use of this bias current, not only in the development of the required biases for the amplifier, but in developing each regenerated pulse itself. It employs two principal circuit elements of which one is a voltage stabilizer and the other is an amplifier. The voltage stabilizer may advantageously take the form of a unidirectionally conducting device such as a silicon rectifier; hereinafter termed a diode. These two principal elements are connected in parallel; and the parallel combination is connected in series with one of the two conductors of the cable so that the constant bias current is shared between them, there being no additional series impedance except the very small one provided by an input transformer. In the case of an undersea cable, which is normally of the coaxial variety, the conductor in series with which this parallel combination is connected is preferably the inner conductor or core, in which case the outer conductor or sheath provides a convenient return path for the operating bias current.

For the sake of its compactness and low power requirements the gain-providing element is advantageously a transistor. It is biased to the threshold of collector conduction, i.e., its collector current cutoff point so that, in the absence of signal pulses, the entire auxiliary current flows through the diode. Because of the parallel connection of the transistor with the diode, the voltage thus developed across the diode provides the operating bias voltage for the transistor. The diode is advantageously operated in its forward or low resistance condition in which case, because of its known current-voltage characteristic, this voltage is nearly independent of the current flowing through the diode until the current is reduced nearly to zero. The magnitude of the voltage thus supplied by the diode may readily be made fully compatible with the bias voltage requirements of the amplifier by the use of as many such diodes in series as may be necessary, in which case, for the same current, the voltages developed by the individual diodes are additive. In the example to be described, in which the amplifier is a transistor, two such diodes suffice.

Upon the arrival of a signal pulse, it is coupled to the emitter-base circuit of the transistor as its input terminals and in a polarity such as to drive the transistor above cutoff. The transistor then commences to draw current. Because the bias current, which is held substantially constant by a suitable current regulator at the transmitter station greatly exceeds the signal pulse in magnitude, the total available current at the repeater is narrowly restricted. Hence, the current drawn by the transistor is to a large extent diverted from the diodes. Because, however, of the near flatness of the diode characteristic, the potential of the collector electrode of the transistor remains nearly constant as its current increases. This constancy of the diode voltage accelerates the withdrawal of diode current by the transistor while, at the same time, delaying the development of the regenerated output pulse.

As the conduction of the transistor increases in this fashion, it eventually reaches the point at which the transistor draws all the available current and presents a very low resistance, whereupon the voltage across the diodes collapses abruptly; and this abrupt change in the potential difference between the input terminals of the repeater and its output terminals is utilized as the output pulse of the repeater and is transmitted to the next repeater.

Inasmuch as the magnitude of this abrupt voltage change is dependent only on the diode characteristic, the bias current and, to a lesser extent, the voltage drop across the transistor when it is drawing all the available current, the output pulse is independent of the magnitude of the input pulse and is thus a regenerated pulse.

The abruptness of this shift of the current from the diodes to the transistor may be accentuated by an external feedback path from the collector of the transistor to its base, the coupling being preferably inductive in character, as in a blocking oscillator. This provides strong regenerative action during the transient condition, measured by the rise time of the output pulse, while allowing the regeneration to fall practically to zero at the end of this rise time. When the input pulse terminates and the current applied to the input terminals of the repeater is restored to its original magnitude, namely the auxiliary current alone, these operations are reversed: the transistor is cut off and the diodes carry the entire current and provide the collector operating voltage, whereupon the repeater is in readiness to regenerate the next pulse of an incoming train.

With this arrangement the diodes, under the influence of the auxiliary current, furnish the operating bias for the collector electrode of the transistor, but they also do much more: they stabilize the magnitude of the bias, they accentuate the regenerative feedback and they develop the regenerated output pulse.

Transmission of pulses that are always of the same polarity and of various spacings, as in the case of pulse code modulation, makes for a variation in the long time average of the pulse signal. One of the unfortunate consequences of this variation has come to be known as "zero wander." The art contains a long history of different attacks on the zero-wander problem. Among the more recent of these is the attack presented in L. R. Wrathall patent 2,703,368, granted March 1, 1955. The present invention presents a far simpler solution, namely to ensure that by virtue of the close spacing among the repeaters the dispersion of the transmission medium between repeaters shall be insufficient to degrade any pulse to the point at which its tail carries over into the next pulse position and, by appropriate design of the input transformer, to ensure that its overshoot shall be substantially completed before the arrival of the next pulse. The overshoot itself, of course, is of advantage in restoring the repeater, at the termination of each input pulse, to its original condition.

Figure 2:
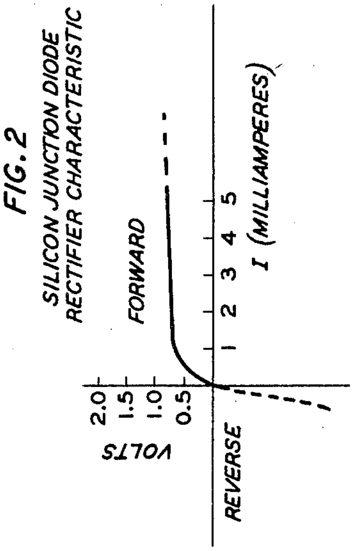

The invention will be fully apprehended from the following detailed description of an illustrative embodiment thereof taken in connection with the appended drawings in which:

FIG. 1 is a schematic circuit diagram showing a submarine transmission system including a repeater in accordance with the invention; and FIG. 2 is a graph showing the current-voltage characteristic of a silicon junction diode rectifier.

Referring now to the drawings, a West station comprises a message pulse source 1 that is coupled to a coaxial transmission line 10, for example an undersea cable, by way of a transformer 2 and a blocking condenser 3. It also comprises a source of auxiliary current comprising a battery 4, a low-pass filter 5 and an adjustable current regulator 6. To obtain the full advantages of the invention the battery 4 should deliver a steady voltage of sufficient magnitude to enable the current regulator to be adjusted to deliver a current of about 5 milliamperes. This current source is conductively connected to the cable 10 with a polarity to apply positive voltage to the core. At an East station the output of the cable 10 is coupled by way of a blocking condenser 3′ and a transformer 2′ to a pulse receiver 9 while a similar source of current, comprising a battery 4′, a filter 5′ and a current regulator 6′ is connected directly to the conductors of the cable 10 with a polarity to apply negative potential to the core. This division of the current source between the two terminal stations reduces, by a factor 2, the maximum steady potential difference between the cable core and its sheath as compared with an arrangement, equally suitable in principle, in which the entire auxiliary current source is located at one station.

In the center of the figure are shown the circuit details of a pulse repeater in accordance with the invention. They are enclosed in a bulb 11 to indicate a possibly necessary local enlargement of the outer diameter of the cable sheath to accommodate them although, as a practical matter, the enlargement is far less than that indicated and, in some cases, no enlargement is necessary at all.

Between the West station and the repeater shown in detail, the outline of the cable 10 is shown in broken lines to indicate that this portion of the cable may be of great length and may include one or more other repeaters. The same holds for the portion of the cable 10 extending between the repeater shown and the East station.

Within the bulb 11, the sheath of the incoming cable is conductively connected by way of a bus 12 to the sheath of the outgoing cable. The core of the incoming cable is returned to the sheath by way of a bypass condenser 13 and the bus 12 and it is connected to the core of the outgoing cable by way of the primary winding of an input transformer 15 and two silicon rectifier diodes 17, 18 in series, there being no additional circuit elements in this series path. Thus the regulated auxiliary current flows through the diodes 17, 18 in series and, as a result, a voltage is developed across them. When an auxiliary current of 5 milliamperes, flowing from West to East, the voltage developed across the diodes 17, 18, poled for forward conduction as shown, is about 1.5 volts. The series resistance of the two diodes, under these conditions, is thus 300 ohms.

The anode of the first diode 17 is connected directly to the emitter electrode 21 of a P-N-P germanium junction transistor 20 while the cathode of the second diode 18 is connected to the collector electrode 22 of the transistor 20 by way only of the primary winding of a feedback transformer 23. The base electrode 24 of the transistor 20 is connected by way of the secondary winding of the feedback transformer 23 and the secondary winding of the input transformer 15 to a point of suitable potential. This point may, indeed, be the emitter electrode 21 itself. As a refinement, however, it is preferably selected as the common point 25 of a low resistance thermistor 26 of negative temperature coefficient and a resistor 27 of large magnitude which are together shunted across the two diodes 17, 18. This auxiliary series circuit may be proportioned in well-known fashion to compensate for variations with temperature of the characteristic of the transistor 20. It does this by applying to the base electrode 24 a minute, temperature-dependent bias. The resistor 27 may be of several thousands of ohms magnitude, and thus many times higher than the resistance of either of the two principal branches of the diode-transistor combination. Hence the current diverted into this by-path can safely be neglected in considering the operation.

In the quiescent condition before the arrival of an incoming pulse the collector 22 of the transistor 20 is biased, by the voltage drop across the diodes 17, 18, in the proper polarity to place it in readiness for operation; that is to say, with a junction transistor of N-type conductivity, the bias thus applied to the collector 22 is negative, and of a suitable magnitude, namely 1.5 volts, to make for satisfactory transistor operation while ensuring against overload.

The input transformer 15 is advantageously wound with more turns on its secondary winding than on its primary winding to provide a stepup in voltage, of 4 or 5 to 1, as between an incoming pulse applied to its primary winding and the resulting transformed pulse applied between the emitter electrode and the base electrode of the transistor. The polarities of the connections are such that, for an incoming pulse of positive polarity, the voltage initially applied to the emitter electrode 21 is positive while that initially applied to the base electrode 24 is negative. With this polarity of the secondary winding connections the leading edge of an incoming positive pulse, representing a change in the current on the cable that is small as compared with the auxiliary current, commences to drive the transistor 20 away from its collector current cutoff condition and into its conducting condition. By virtue of the operation of regenerative feedback through the transformer 23 from the collector electrode 22 to the base electrode 24 this action is cumulative and so abrupt as to be essentially a switching operation. This cumulative action proceeds until the transistor 20 has seized all of the available auxiliary current, namely 5 milliamperes or slightly more, in which case the resistance of the transistor 20 is only about 10 ohms. The resistance of the primary winding of the transformer 23 being 10 ohms or so, the entire resistance between the end points of the diode pair is about 20 ohms, so that, with 5 milliamperes, the voltage drop between these points is 0.125 volt. At the same time, diversion of all current from the diodes 17, 18 eliminates the diode resistance drop, so that the entire voltage drop between the diode end points collapses abruptly from its original magnitude of 1.5 volts to its new magnitude of 0.125 volt and, provided only that the impedance of the outgoing cable is of suitable magnitude to support it, this collapse represents a rise of potential of the outgoing cable core by about 1.4 volts.

The abruptness of this action, and hence the sharpness of the outgoing pulse, are accentuated by the shapes of the forward characteristics of the diodes 17, 18 which, as shown in FIG. 2, are nearly flat throughout a range of 85 percent of the current flowing through them, so that the bias on the collector electrode 22 is maintained at its initial magnitude of 1.5 volts while the diode current falls from 5 milliamperes to 1 milliampere or less.

After a brief interval, dependent on the design of the input transformer 15, the potential developed across its secondary winding returns to zero and commences its overshoot in the opposite polarity. In accordance with the invention the input transformer 15 is proportioned to complete a single cycle of its secondary voltage swing in a single pulse interval and therefore to reach zero potential in about four-tenths (0.4) of a pulse interval. With pulses each of which occupies the same fraction (0.4) of its assigned interval, the initial rise and fall of the transformer secondary voltage occupies the same interval as the incoming pulse itself, so that the trailing edge of the incoming positive pulse is aided by the overshoot of the transformer secondary voltage in initiating a return of the transistor to its nonconducting condition and, with the assistance of regeneration provided by the feedback path, to bring this return to completion abruptly.

As a result of these operations, for an incoming positive pulse of amplitude of $\frac{1}{10}$ volt or so, and seriously degraded in shape, a sharp output pulse of the same polarity, and of 1.4 volts amplitude, is developed. The magnitude, duration and sharpness of the output pulse are dependent only on the bias current, the diodes 17, 18 and the transistor 20 and are substantially independent of the magnitude of the input pulse. To preserve this independence, it is advantageous to ensure a minimum of coupling between the input terminals of the repeater and its output terminals. The bypass condenser 13 serves this purpose and the additional function of storing the energy needed to initiate pulse repetition at the next repeater of the cable.

When the invention is to be employed in pulse code modulation transmission, it is necessary to time the pulses handled by each repeater. This is appropriately accomplished by introducing in the repeater a branch path containing elements resonant at the pulse repetition rate. Crystal 30 operating in its series resonant mode is suitable for this purpose. In order to increase the characteristically narrow bandwidth associated with typical crystals a series padding resistor 31 is included in the timing branch path.

The simplicity of the repeater is such that it is economical to space such repeaters more closely along the transmission path than has been customary with repeaters of greater complexity. Such close spacing greatly reduces the problem of pulse regeneration on the time scale and permits the use of the simplest possible timing apparatus, namely a series resonant element such as a piezoelectric crystal, operating in its series resonant mode at the basic pulse repetition rate, connected between the input terminal of the repeater and its output terminal.

In the foregoing description the conductivity type of the transistor, in this case N-type conductivity for a P-N-P junction transistor, the interconnection of the diode terminals with the transistor electrodes, namely emitter to anode and collector to cathode, the flow of auxiliary current from West to East and the positive polarity of the signal pulses were coordinated to provide a single illustration. Departures and inversions of conductivity types, direction of current flow, polarities of pulses and the like are contemplated by the invention and will suggest themselves to those skilled in the art. For example, if it is desired to employ a P-type transistor instead of an N-type transistor then, for operation in the fashion described in he foregoing illustrative case, the interconnections of the diode terminals with the transistor electrodes should be reversed, as should also the direction of flow of the auxiliary current.

Again, the diodes of the illustration are operated in their forward conduction condition only because the voltages that they develop in this fashion are very low and hence the accumulated voltage required for a cable including some thousands of repeaters is not excessive. In the case of a short cable or, indeed, in any case where only a comparatively small number of repeaters are required it may be of advantage to employ so-called "Zener" diodes as described, for example in W. Shockley Patent 2,714,702, granted August 2, 1955, and to operate them in their reverse directions. It is known that with such devices the potential at which breakdown occurs is controllable in fabrication between wide limits, and that the reverse characteristic of such a device is exceedingly flat: its voltage is maintained very nearly constant over a very wide range of currents. Such devices may, of course, be utilized for practicing the present invention in which case the representation of the arrangement would be merely to interchange, in FIG. 1, the direction in which the arrows that represent the diodes point.

Still other departures from the illustrative embodiment described and shown above are within the scope of the invention.

What is claimed is:

1. In combination with a source of unipolar signal pulses to be transmitted and a source of a substantially constant auxiliary current, a two-conductor transmission path proportioned to carry said signal pulses and said auxiliary current simultaneously and a pulse repeater connected in tandem with said path, said repeater comprising a two-terminal unidirectionally conductive device and a transistor having emitter, collector and base electrodes, said device being connected in parallel with the emitter-collector path of said transistor, said parallel combination being connected in series with a first conductor of said transmission path, means for coupling and inverting incoming ones of said unipolar signal pulses to the base electrode of said transistor, and bypass storage means connected between the emitter electrode and a second conductor of said transmission path, which path is devoid of series impedance elements other than said parallel combination and said coupling means.

2. Apparatus as defined in claim 1 wherein said transistor is a P-N-P junction transistor, wherein the emitter electrode of said transistor is connected to the anode of said device and the collector electrode of said transistor is connected to the cathode of said device.

3. In combination with apparatus as defined in claim 1, means responsive to said auxiliary current for producing an emitter-to-base bias voltage causing said transistor to be at the nonconduction threshold of its collector current cutoff condition in the absence of applied pulses despite temperature variations of said transistor.

4. Apparatus as defined in claim 1 wherein said transistor is fabricated to manifest a resistance in its emitter-collector path of a preassigned small magnitude when driven into its conducting condition by an applied pulse, and wherein said device is proportioned to manifest a resistance to said auxiliary current of at least ten times this magnitude when carrying said auxiliary current.

5. Apparatus as defined in claim 1 wherein said coupling means comprises a transformer of which the primary winding is connected directly in series with the emitter electrode of said transistor and of which the secondary winding interconnects the emitter electrode of the transistor with its base electrode.

6. Apparatus as defined in claim 5 wherein the transformer is proportioned to provide a voltage stepup ratio of at least three to one.

7. Apparatus as defined in claim 5 wherein said coupling transformer is proportioned to respond to an incoming unipolarity pulse with a single oscillatory voltage swing having an average amplitude of zero and a duration between two and three times the duration of an incoming pulse.

8. In combination with apparatus as defined in claim 1, an external path for feeding back output current from the collector electrode of the transistor to its base electrode with regentrative polarity.

9. In combination with a source of signal pulses and a source of a substantially constant auxiliary current, a two-conductor transmission path proportioned to carry said signal pulses and said auxiliary current simultaneously and a pulse repeater connected in series with one conductor of said path, said repeater comprising a two-terminal unidirectionally conducting device so poled that said auxiliary current acts to bias it for conduction in the forward direction in the absence of signal pulses, a transistor having an emitter electrode, a collector electrode and a base electrode, said emitter and collector electrodes being connected, respectively, to the terminals of said device, an external feedback path coupling the collector electrode to the base electrode and poled to promote regenerative feedback, the voltage drop across said device thus serving as an operating bias potential for said collector electrode, means for biasing said transistor to collector current cutoff in the absence of incoming pulses, and means for coupling incoming pulses to said base electrode in a sense to promote conduction of said transistor, whereupon said transistor commences to divert said auxiliary current from said device, said diversion being cumulative by virtue of said regenerative feedback until said entire auxiliary current flows through said transistor, and said operations are reversed upon the termination of said incoming pulse, thereby to deliver across said device an output pulse that is a regenerated replica of said input pulse and having an amplitude equal to the difference between the original voltage drop across said device and the conductive voltage drop across said transistor, and independent of the amplitude of said input pulse.

10. In combination with a source of signal pulses to be transmitted and a source of a substantially constant auxiliary current, a two-conductor transmission line proportioned to carry said signal pulses and said auxiliary current simultaneously and a pulse repeated connected in tandem with said line, said repeater comprising a two-terminal unidirectionally conductive device connected in series with one conductor of said line and poled to pass substantially all of said auxiliary current therethrough, the passage of said auxiliary current developing a steady voltage across the terminals of said device, a transistor having emitter, collector and base electrodes, the emitter-collector path of said transistor interconnecting the terminals of said device, means for applying a bias voltage derived solely from said steady voltage to the base-collector path of said transistor, and means for coupling the signal pulses into the emitter-base path of said transistor, thereby, for each signal pulse, to substantially increase the conductivity of said emitter-collector path and to divert said auxiliary current from said device to said transistor.

11. In combination with a signal channel conveying a steady current at a time varying signal, a signal repeater included in the channel, said repeater comprising a unidirectionally conductive device included in said channel and passing substantially all of the steady current therethrough, switching means connected in shunt with said device, said switching means manifesting a high impedance condition and a low impedance condition, means for maintaining said switching means in its high impedance condition solely by the passage of said steady current through the said device, and means responsive to the time varying signal for establishing said switching means in its low impedance condition, thereby to divert said steady current from said device to said switching means.

12. In combination with a source of signal pulses to be transmitted and a source of a substantially constant auxiliary current, a two-conductor transmission path proportioned to carry said signal pulses and said auxiliary current simultaneously and a pulse repeater connected in tandem with said path, said repeater comprising a two-terminal unidirectionally conductive device and a transistor having an emitter electrode, a collector electrode and a base electrode, said device being connected in parallel with the emitter-collector path of said transistor, said parallel combination being connected in series with one conductor of said path, said base electrode being connected to said emitter electrode through a closed-circuit path containing only passive elements and conductively isolated with respect to said constant current from the other conductor of said path, which elements in the path of said auxiliary current are proportioned to limit the emitter-base voltage produced thereby, to that magnitude causing said transistor to remain in its collector current cut-off condition, whereby said auxiliary current flows substantially through said device producing a signal voltage thereacross, and means for coupling incoming pulses into said closed-circuit path causing a substantial loop current to flow therein, thereby to lower the collector-emitter impedance of said transistor and to divert said auxiliary current from said device to said transistor, whereby the potential drop across said device is abruptly altered in magnitude during the duration of each one of said pulses.

13. In combination with a source of unipolar signal pulses to be transmitted and a source of a substantially constant auxiliary current, a two-conductor transmission path proportioned to carry said signal pulses and said auxiliary current simultaneously and a pulse repeater connected in tandem with said path, said repeater comprising a two-terminal unidirectionally conductive device and a transistor having emitter, collector and base electrodes, said device being connected in parallel with the emitter-collector path of said transistor, said parallel combination being connected in series with a first conductor of said transmission path, a voltage divider interconnecting the emitter electrode with the collector electrode and comprising a high resistance element connected in series with a temperature-dependent low resistance element, and a connector extending from the common terminal of said two resistance elements to the base electrode of said transistor, a first means for coupling and inverting incoming ones of said unipolar signal pulses to the base electrode of said transistor, and bypass storage means connected between the emitter electrode of said transistor and a second conductor of said transmission path, which path is devoid of series impedance elements other than said parallel combination and said coupling means.

14. In combination with a source of unipolar signal pulses to be transmitted and a source of a substantially constant auxiliary current, a two-conductor transmission path proportioned to carry said signal pulses and said auxiliary current simultaneously and a pulse repeater connected in tandem with said path, said repeater comprising a two-terminal unidirectionally conductive device and a transistor having emitter, collector and base electrodes, said device being connected in parallel with the emitter-collector path of said transistor, said parallel combination being connected in series with a first conductor of said transmission path, a first means for coupling and inverting incoming ones of said unipolar signal pulses to the base electrode of said transistor, timing means comprising a piezoelectric crystal element interconnecting the input point of said first coupling means with the output point of said unidirectionally conductive device, said element being proportioned to be resonant in its series mode at the basic repetition rate of the pulses of said pulse source, and bypass storage means connected between the emitter electrode and a second conductor of said transmission path, which path is devoid of series impedance elements other than said parallel combination and said coupling means.

15. A three-terminal pulse repeater which comprises a transformer having a primary winding and a secondary winding, a unidirectionally conductive device, said device and the primary winding of said transformer being series connected and interconnecting the first and third terminals of the repeater, a transistor having emitter, collector and base electrodes, the emitter-collector path of said transistor being connected in shunt with said device, the emitter-base path of said transistor being connected for direct currents solely in shunt with the secondary winding of said transformer, and a capacitor interconnecting the emitter electrode with the third terminal of said repeater.

References Cited in the file of this patent

UNITED STATES PATENTS

| | | |
|---|---|---|
| 2,504,692 | Jacobs | Apr. 18, 1950 |
| 2,703,368 | Wrathall | Mar. 1, 1955 |
| 2,745,012 | Felker | May 8, 1956 |
| 2,747,111 | Koch | May 22, 1956 |
| 2,825,813 | Sperling | Mar. 4, 1958 |

FOREIGN PATENTS

| | | |
|---|---|---|
| 113,873 | Australia | Sept. 12, 1941 |

OTHER REFERENCES

"Transistor Pulse Regenerative Amplifiers," by Tendick, a Bell Telephone System technical publication, Monograph #2703, September 1956.

Junction Transistor Electronics, by Hurley, 1958, publication by Wiley, New York, page 226.